(12) United States Patent
Presotto et al.

(10) Patent No.: US 8,745,195 B1
(45) Date of Patent: Jun. 3, 2014

(54) NETWORK FAILURE DETECTION

(75) Inventors: David Presotto, Palo Alto, CA (US);
Ankur Jain, Mountain View, CA (US);
Aspi Siganporia, Saratoga, CA (US);
Sushant Jain, San Jose, CA (US)

(73) Assignee: Google Inc., Mountain View, CA (US)

( * ) Notice: Subject to any disclaimer, the term of this patent is extended or adjusted under 35 U.S.C. 154(b) by 94 days.

(21) Appl. No.: 13/493,094

(22) Filed: Jun. 11, 2012

Related U.S. Application Data

(63) Continuation of application No. 11/865,969, filed on Oct. 2, 2007, now Pat. No. 8,224,942.

(51) Int. Cl.
*G06F 15/173* (2006.01)
(52) U.S. Cl.
USPC .............................. 709/223; 709/224; 709/225
(58) Field of Classification Search
USPC ........................................................ 709/223
See application file for complete search history.

(56) References Cited

U.S. PATENT DOCUMENTS

| | | | |
|---|---|---|---|
| 5,948,108 | A | 9/1999 | Lu et al. |
| 6,262,976 | B1 | 7/2001 | McNamara |
| 7,246,156 | B2 | 7/2007 | Ginter et al. |
| 7,451,209 | B1 | 11/2008 | Schieber et al. |
| 2001/0052087 | A1 | 12/2001 | Garg et al. |
| 2002/0138599 | A1 | 9/2002 | Dilman et al. |
| 2003/0084159 | A1 | 5/2003 | Blewett |
| 2005/0120107 | A1 | 6/2005 | Kagan et al. |
| 2005/0188071 | A1* | 8/2005 | Childress et al. ............. 709/223 |
| 2005/0193127 | A1 | 9/2005 | Moore et al. |
| 2005/0216729 | A1 | 9/2005 | Joels et al. |
| 2006/0059136 | A1* | 3/2006 | Wooldridge et al. ............. 707/3 |
| 2006/0230143 | A1 | 10/2006 | Ziegler et al. |
| 2008/0141048 | A1* | 6/2008 | Palmer et al. .................. 713/300 |
| 2008/0209030 | A1 | 8/2008 | Goldszmidt et al. |
| 2008/0221918 | A1 | 9/2008 | Petersen et al. |
| 2009/0019181 | A1 | 1/2009 | Fang et al. |

* cited by examiner

*Primary Examiner* — Shaq Taha
(74) *Attorney, Agent, or Firm* — Fish & Richardson P.C.

(57) ABSTRACT

A number of requests for an alternative network location are identified, where the requests for the alternative network location are generated after failure of one or more previous requests to reach a first, previous network location as a result of a network brownout. It is determined if the number of requests for the alternative network location exceed a threshold value for a period of time, and if so, an alarm is generated.

13 Claims, 4 Drawing Sheets

NETWORK FAILURE DETECTION

CROSS-REFERENCE TO RELATED APPLICATIONS

This application is a continuation of U.S. patent application Ser. No. 11/865,969, filed on Oct. 2, 2007 which is incorporated herein by reference.

FIELD

The following disclosure relates to network failure detection in the Internet.

BACKGROUND

The Internet has evolved into a complex distributed system, and has become an important aspect of day-to-day life. Achieving reliable communication from a user to a web site, such as Google.com, is a challenging task, and depends on multiple aspects most of which are beyond the control of either the user or the website. This is because the Internet operates in a truly distributed manner in which packets travel over multiple independent organizations or ISPs. Network failures, also called network brownouts, can occur because of various problems such as server failures, overloaded servers, fiber cuts in the communication path, router failure, misconfigured policies by ISPs, problems in the Domain Name System (DNS), and the like. The DNS is the system that is responsible for translating text-based domain names, such as "Google.com," into Internet Protocol (IP) numbers. Whenever a user visits a web site using the text-based domain name "google.com", the "google.com" DNS servers first receive a DNS query packet. The path traversed by a DNS packet can be different than the path traversed by the actual user request.

SUMMARY

This specification describes technologies relating to the detection of network brownouts.

Potential network brownouts are identified when a large number of client requests to an alternative network location occur, where the requests to the alternative network location are indicative of the inability of one or more clients to connect to a previous, desired host location. A large number of requests may be identified by comparing the number of requests for the alternative location to one or more threshold values, a moving average of requests for the alternative network location, and/or historical data.

A method can include generating an alarm when the requests for the alternative network location exceed the threshold value during the period of time. Other embodiments include corresponding systems, apparatus, and computer program products.

According to one feature, the threshold value is based at least in part on a median value of the number of requests, and/or a median value of the number of requests over a past period of time. According to another feature, the threshold value is based at least in part on an exponentially weighted moving average of the number of requests over a period of time. The threshold value can also be based at least in part on a standard deviation of the number of requests over a period of time.

According to other features, the subject matter described in this specification can be embodied in methods that include determining if the number of requests for the network location exceed a second threshold value, and generating an alarm when the requests for the network location exceed the second threshold value. The period of time can be, for instance, approximately 2 minutes. According to yet other features, the methods can include collecting request information corresponding to the requests received at one or more Domain Name System (DNS).

According to still other features, methods described herein can include generating an alarm, including displaying a graphical indicator that the requests for the network location exceed the threshold value during the period of time. One or more Domain Name System (DNS) servers can reply with a different network location after the failure of one or more previous requests to reach a previous network location. According to still other features, subsequent to generating the alarm, a user attempting to reach the previous network location may be redirected to the network location.

These general and specific features may be implemented using a system, a method, or a computer program, or any combination of systems, methods, and computer programs. Particular embodiments of the subject matter described in this specification can be implemented to realize one or more of the following advantages. The disclosure described that an alarm can be provided when one or more network brownouts are identified.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
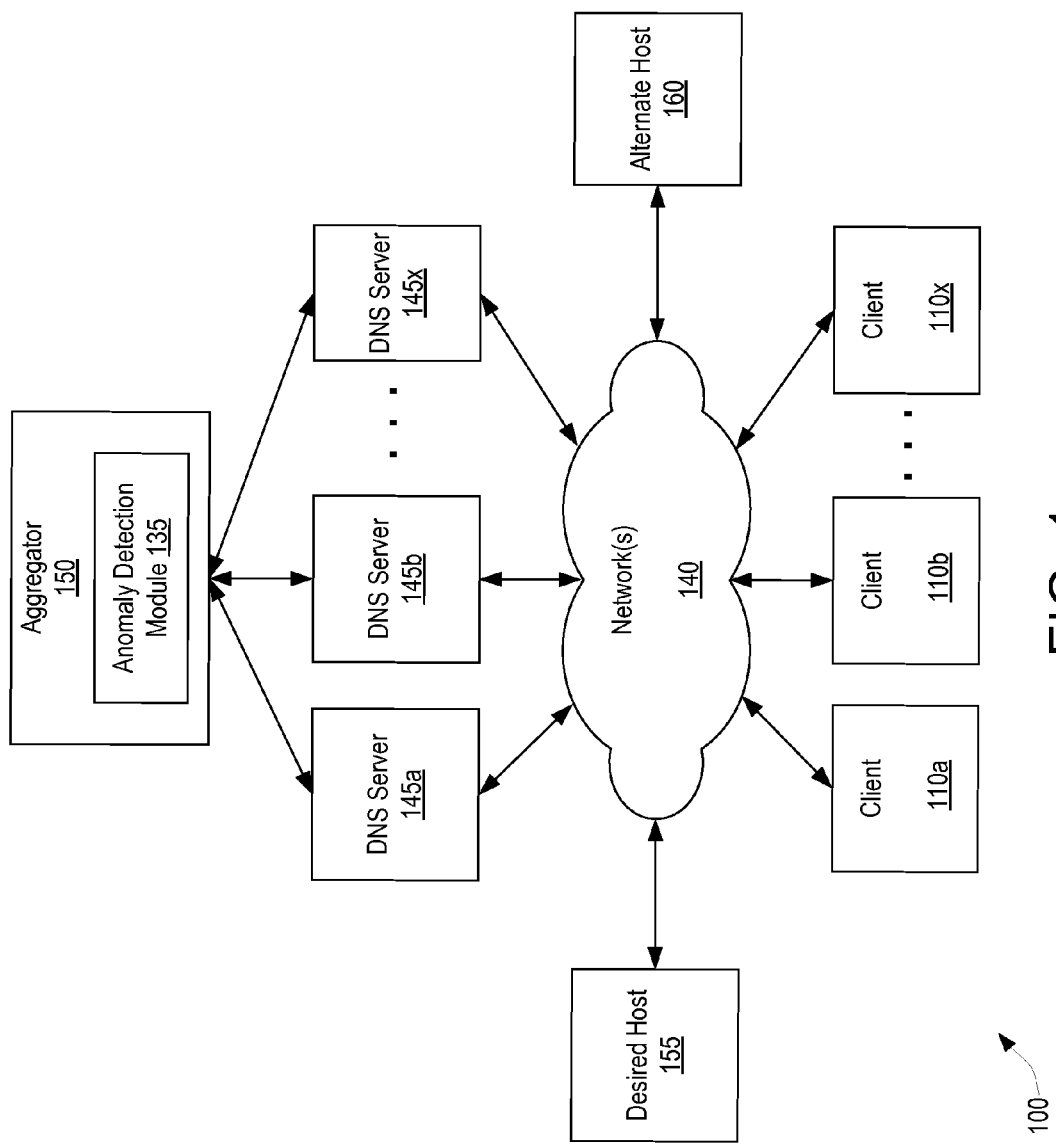
FIG. 1 is a block diagram of an example network brownout detection system.

FIG. 1 is a block diagram of an example network brownout detection system 100. The system 100 includes one or more clients 110*a*, 110*b*, . . . 110*x* in communication with one or more DNS servers 145*a*, 145*b*, . . . 145*x* via at least one network 140. The clients 110*a*, 110*b*, . . . 110*x* can include a device, for example, a personal computer, a wireless telephone, a personal digital assistant (PDA), a lap top computer, or another type of computation or communication device, a thread or process running on one of these devices, and/or an object executed by or in one of these devices. The network(s) 140 can include one or more local area networks (LANs), wide area networks (WANs), telephone networks, such as the Public Switched Telephone Network (PSTN), intranets, the Internet, and/or or other type of network.

According to some implementations, the one or more DNS servers 145*a*, 145*b*, . . . 145*x* receive and identify requests for network locations, e.g., web sites, from the one or more clients 110*a*, 110*b*, . . . 110*x* via the network(s) 140. The requests (e.g., DNS requests) received by each of the DNS servers 145*a*, 145*b*, . . . 145*x* are collected and logged by an aggregator 150, which is in communication with the one or more DNS servers 145a, 145b, . . . 145x. The aggregator 150 can include one or more computers, including servers, operable to pull data or receive data from the DNS servers 145a, 145b, . . . 145x representative of requests for network locations. The aggregator 150 pulls data from the DNS servers 145a, 145b, . . . 145x at regular intervals, e.g., 1, 2, or 5 minute intervals, or at other intervals. In alternative implementations, the DNS servers 145a, 145b, . . . 145x can push data to the aggregator 150, either at regular intervals or in response to particular events, e.g., the detection of large traffic loads.

The data includes the domain names and/or Internet Protocol (IP) addresses of requested network locations, the timestamp of the requests, and/or the identity of the DNS resolver that transmitted the DNS request. According to an implementation, this data is maintained on each of the DNS servers 145a, 145b, . . . 145x until it is pulled from the DNS servers 145a, 145b, . . . 145x by the aggregator 150. According to an implementation, the aggregator 150 can be a DNS server.

According to an implementation, the aggregator identifies requests made to an alternative host 160 location via the one or more DNS servers 145a, 145b, . . . 145x after failure of the one or more clients 110a, 110b, . . . 110x to connect to a first (i.e., previous), desired host 155 location. According to an implementation, potential network brownouts are identified when a large number of such requests to the alternative host 160 location are identified because the requests to the alternative host 160 location can be indicative of the inability of the one or more clients 110a, 110b, . . . 110x to connect to the previous, desired host 155 location. A large number of requests may be identified compared to one or more threshold values, a moving average of requests for the alternative host 160 location, and/or historical data, or the like.

In an implementation, the aggregator 150 collects data from the DNS servers 145a, 145b, . . . 145x to identify the network location, e.g., the alternative host 160 location, requested by the clients. According to an implementation, network brownouts are presumed to occur only after a number of requests for an alternative network 160 location exceeds one or more thresholds (i.e., threshold values) and/or exceeds the one or more thresholds for a period of time, where the requests for a network location are generated after the failure of one or more previous requests to reach a desired (or different) network 155 location.

As an illustrative example, an application (e.g., a software application) running on one of the clients 110a, 110b, . . . 110x may attempt to communicate with an first IP address to provide data to a first datacenter, but may be unsuccessful, for example, because of one or more inoperable DNS servers. After the unsuccessful attempt at communicating with the first host IP address, the application may attempt to communicate with an alternative IP address associated with an alternative datacenter. This may occur by a program instruction to communicate with the alternative IP address subsequent to failure to communicate with the first host IP address. A network brownout may be identified by the system 100 upon detection by the one or more DNS servers 145a, 145b, . . . 145x that client is requesting communication with the alternative IP address. According to an implementation, a network brownout may be identified only after numerous requests for the alternative IP address occur, which occurs when an attempt is unable to successfully reach the desired first IP address.

Conditions that can result in a failed connection to a network location (e.g., an IP address) can include: (1) the failure of a socket to be created; (2) the failure of a socket connection (e.g., a failed attempt to open a file transfer protocol (FTP), Gopher, or HTTP session for a given site); (3) the failure of an HTTP creation request; and (4) the failure of the transmission of an HTTP request. According to an implementation, if one or more of the above conditions exist, the connection may be retried by attempting to establish connection once again. Alternatively, or after a connection is attempted unsuccessfully two or more times, one or more alternative connections to a different location may be attempted, as in the illustrative example described above.

In particular, to determine if one or more network brownouts occur, the aggregator in some implementations executes an anomaly detection module 135. The anomaly detection module 135 is operable to monitor the traffic of each of the DNS servers 145a, 145b, . . . 145x to identify increases in traffic to network locations, including those known to serve as alternative host 160 locations after failure of a connection with a first host 155 location. According to an implementation, the anomaly detection module 135 is operable to identify how may queries-per-second (QPS) (or the query-per-second rate) each of the DNS servers 145a, 145b, . . . 145x are handling at a given time, which can be determined from the data collected by the aggregator 150. The anomaly detection module 135 is operable to identify network brownouts (or suspected network brownouts) by identifying when the number of requests for a network location (e.g., an alternative network location) exceed one or more thresholds and/or exceed one or more thresholds over a period of time. When network brownouts are identified, or suspected, the anomaly detection module 135 can trigger one or more alarms depending on the significance of the anomaly detected by the anomaly detection module 135.

According to an implementation, the anomaly detection module 135 can determine the number of requests for an alternative DNS name from each Autonomous System Number (ASN). Alternative DNS requests may be requests for an alternative network location generated after the failure of one or more previous requests to reach a first location. The anomaly detection module can use these numbers of requests, or ASN counts, over a past period of time to determine if a network brownout is suspected.

The system 100 shown in FIG. 1 is an example network detection system. Although multiple clients 110a, 110b, . . . 110x, one or more DNS servers 145a, 145b, . . . 145x, and a single aggregator 150 are illustrated in FIG. 1, there can be more aggregators and more or fewer clients and/or DNS servers. For instance, some of the functions performed by the aggregator 150 can be performed by one or more other aggregators such that the aggregator 150 can represent several devices, such as a network of computer processors and/or servers. According to an implementation, there can also be one or more global aggregators that collect data retrieved by one or more aggregators, such as the aggregator 150 shown in FIG. 1. Additionally, in some implementations a DNS server 145a, 145b, . . . 145x can perform a function of the aggregator 150 and the aggregator 150 can perform a function of a DNS server 145a, 145b, . . . 145x.

Furthermore, although displayed outside of the network(s) 140, the clients 110a, 110b, . . . 110x, one or more DNS servers 145a, 145b, . . . 145x, and aggregator 150 can be included in the network(s) 140. Although the aggregator 150 is illustrated as communicating directly with the one or more DNS servers 145a, 145b, . . . 145x, the aggregator 150 and one or more DNS servers may communicate indirectly with each other over the network(s) 140. The anomaly detection module 135 may also be implemented in one or more devices external to the aggregator 150 that are in communication with the aggregator 150 (or one or more aggregators). Additionally, each of the clients 110*a*, 110*b*, . . . 110*x*, one or more DNS servers 145*a*, 145*b*, . . . 145*x*, and aggregator 150 can connect to the network(s) 140 via wired, wireless, or optical or other connections.

Figure 2:
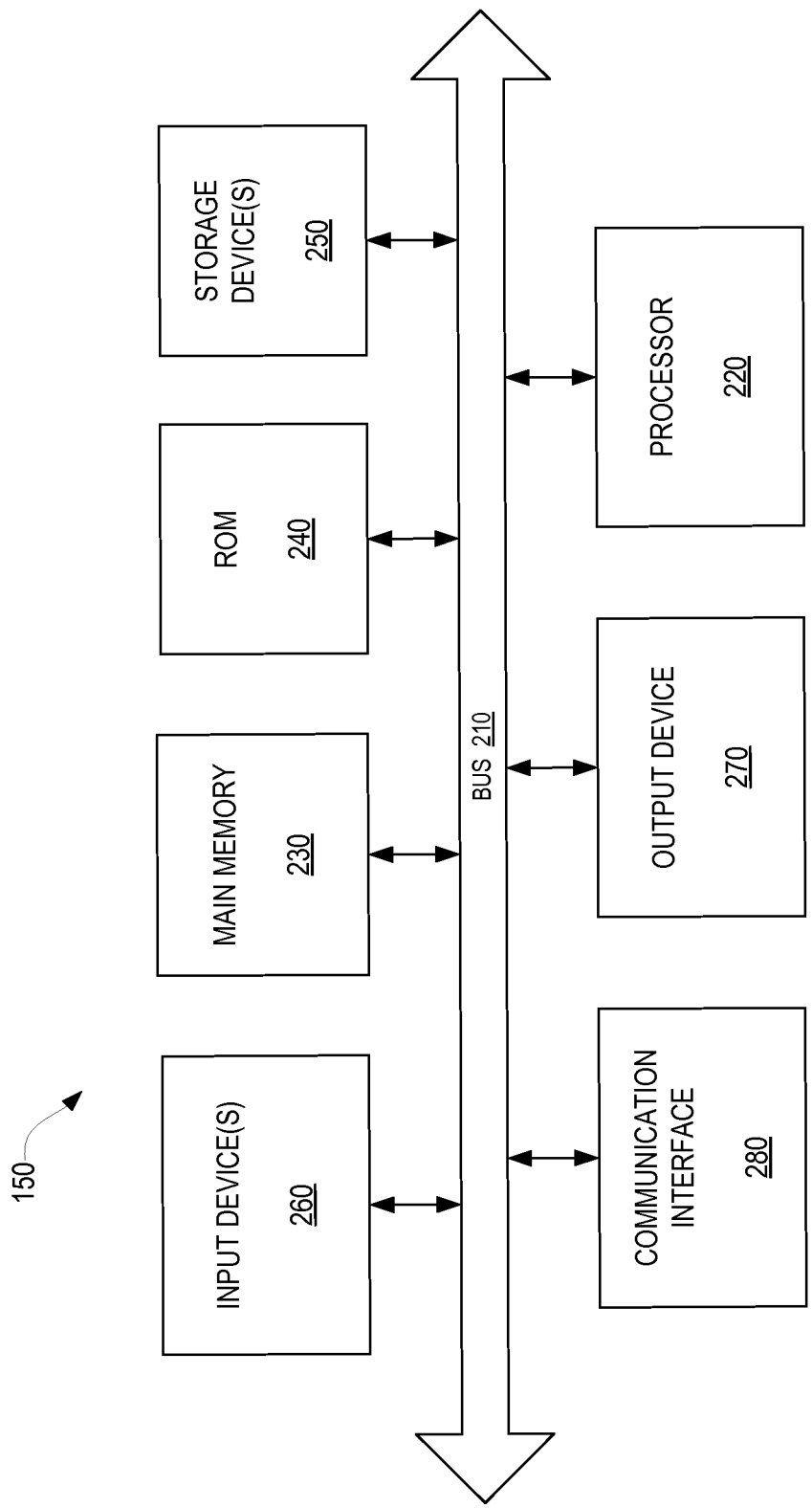
FIG. 2 shows an example aggregator in the network detection system of FIG. 1.

FIG. 2 shows the aggregator 150 of FIG. 1, according to an illustrative implementation. The aggregator 150 can include a bus 210, a processor 220, a main memory 230, a read only memory (ROM) 240, a storage device 250, one or more input devices 260, one or more output devices 270, and a communication interface 280. The server components may implement, in whole or part, the anomaly detection module 135.

The bus 210 can include one or more paths that permit communication among the components of aggregator 150. The processor 220 includes any type of conventional processor, microprocessor or processing logic that interprets and executes instructions. The main memory 230 can include a random access memory (RAM) or another type of dynamic storage device that stores information and instructions for execution by processor 220. The ROM 240 can include a conventional ROM device or another type of static storage device that stores static information and instructions for use by the processor 220, including, for instance, an operating system. Additionally, the storage device 250 can include a magnetic and/or optical recording medium and its corresponding drive.

In some implementations the aggregator 150 can also include an input device 260 having one or more conventional mechanisms that permit a user to input information to the aggregator 150, such as a keyboard, a mouse, a pen, voice recognition and/or biometric mechanisms, or the like. The output device 270 includes one or more conventional mechanisms that output information to the user, such as a display, a printer, a speaker, or the like. The communication interface 280 can include any transceiver-like mechanism that enables the aggregator 150 to communicate with other devices and/or systems. For example, the communication interface 280 can include mechanisms for communicating with another device or system via one or more networks, such as the network(s) 140.

In operation the aggregator 150 is operable to execute an anomaly detection module 135 to identify network brownouts and/or suspected network brownouts, as described in further detail below with respect to FIGS. 3 and 4. The aggregator 150 is further operable to generate one or more alarms upon detection of network brownouts and/or suspected brownouts.

In one implementation, the aggregator 150 performs these operations in that the processor 220 executes software instructions contained in a computer-readable medium, such as memory 230. The software instructions can be read into the memory 230 from another computer readable medium, such as a data storage device 250, or from another device via the communication interface 280. The software instructions contained in the memory 230 cause processor 220 to perform processes described in this disclosure. Alternatively, hard-wired circuitry can be used in place of or in combination with software instructions to implement processes consistent with the disclosure. Thus, implementations are not limited to any specific combination of hardware circuitry and software.

Figure 3:
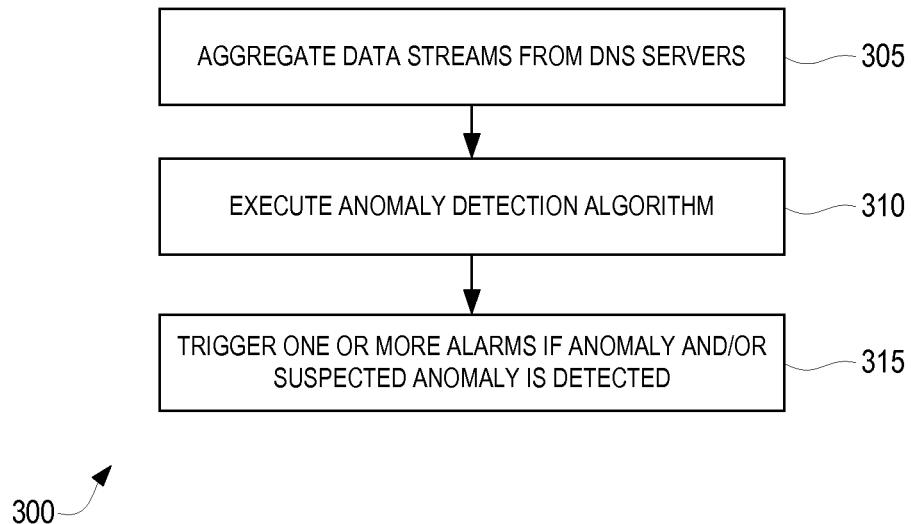
FIG. 3 is a high level flow chart of an example process for triggering alarms for network brownouts.

FIG. 3 is a high level flow chart of an example process 300 for triggering alarms for network brownouts. The process 300 begins with the aggregation of data streams from one or more DNS servers (305). According to an implementation, the aggregator 150 can aggregate data that identifies a number of requests for network locations from one or more DNS servers, such as requests for network locations received by the DNS servers 145*a*, 145*b*, . . . 145*x* shown in FIG. 1. The aggregated data can include the domain names and/or Internet Protocol (IP) addresses of requested network locations, the timestamp of the requests, and/or the identity of the DNS resolvers that transmitted the DNS requests.

According to an implementation, the aggregation of data from one or more DNS servers can occur via data pulls by the aggregator 150 from the DNS servers 145*a*, 145*b*, . . . 145*x* in 'X' minute intervals, such as in 2 minutes intervals. The aggregator can maintain a local timestamp for the last polling time of each DNS server, and after an interval of 'X' minutes, can pull all data collected since the time indicated by the previous timestamp. Although 2 minute intervals are described herein, it will be appreciated that other intervals may be used, such as 1, 5, or 10 minute intervals.

After data is aggregated, the process includes the execution of an anomaly detection algorithm (310). According to an implementation, the anomaly detection algorithm may be executed by the anomaly detection module 135, for instance, residing in the aggregator 150 as shown in FIG. 1. According to an implementation, the anomaly detection module 135 is operable to identify the QPS collectively received from the DNS servers such as DNS servers 145*a*, 145*b*, . . . 145*x*, for requests for a network location (e.g., an alternative host location) during a period of time. This information can be determined, for example, from data collected by the aggregator 150. The anomaly detection algorithm is operable to identify if an anomaly (i.e., a network brownout) or a suspected anomaly (i.e., a suspected network brownout) exists by identifying when the number of requests for a network location exceeds one or more thresholds and/or exceeds one or more thresholds over a period of time.

According to an implementation, a suspected anomaly exists when the number of requests for a network location for a period of time exceeds a threshold, and an anomaly exists when the numbers of requests for a network location for multiple periods of time exceed the threshold for a period of time. According to an alternative implementation, a suspected anomaly exists when the number of requests for a network location exceeds a first threshold, and an anomaly exists when the number of requests for a network location exceeds a second threshold.

Next, the process 300 includes the triggering of one or more alarms if a suspected anomaly or anomaly is detected by the anomaly detection algorithm (315). The one or more alarms can include one or more audio and/or visual alerts representing a suspected anomaly or anomaly. For instance, an alert can include the generation of a graphical display showing a color-coded alarms representing suspect anomalies and anomalies, respectively. As an example, an interface showing the volume of requests for a particular network location, such as an alternative network location typically accessed by clients only after the clients are unable to access a first (e.g., primary or host) network location, may highlight suspected anomalies in yellow or red, respectively, which may be represented as 'spikes', or sudden increases in volumes that exceed one or more thresholds. According to an implementation, a suspected anomaly occurs when the volume of requests exceed a threshold value, and an anomaly occurs when the volume of requests exceed a threshold value for a period of time. According to another implementation, one or more graphical representations, such as graphs, can be generated to illustrate the number of queries from one or more users to a first network location and an alternative network location.

Figure 4:
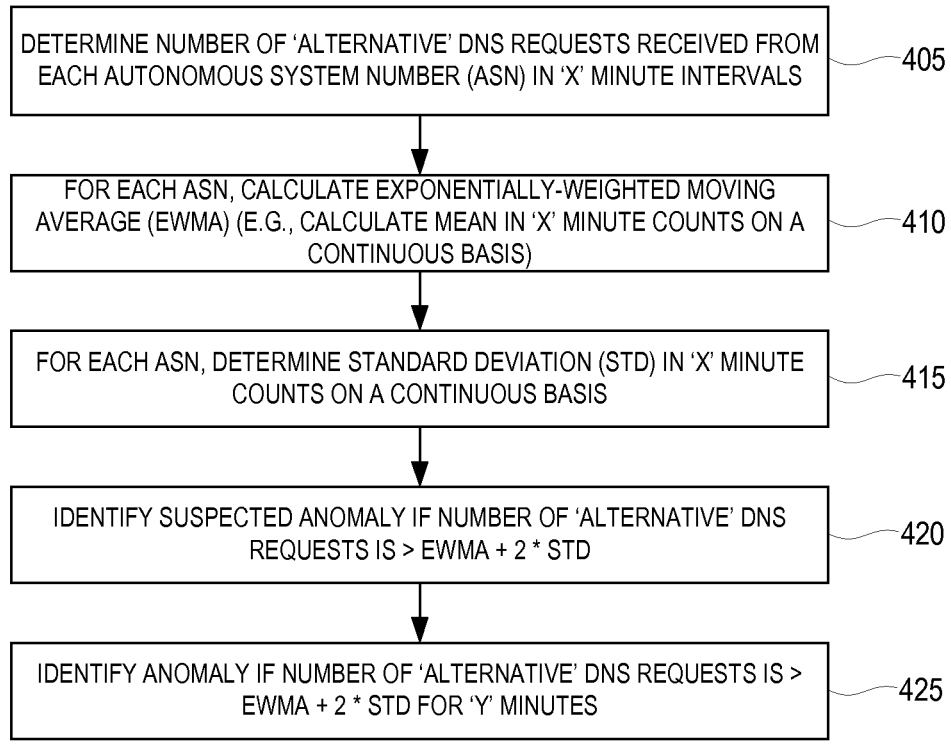
FIG. 4 is a flow chart of an example anomaly detection process.

FIG. 4 is a flow chart of an example anomaly detection process 400 or algorithm. According to an implementation, the process 400 may be performed by the anomaly detection module 135.

The anomaly detection algorithm identifies suspected anomalies and/or anomalies using data aggregated from one or more DNS servers. The data identifies a number of requests for network locations from one or more DNS servers, and can include the domain names and/or Internet Protocol (IP) addresses of requested network locations, the timestamp of the requests, and/or the identity of the DNS resolvers that transmitted the DNS requests. According to an implementation, the requests for network locations are requests for alternative network locations from one or more clients after the clients are unable to access an originally desired first network location.

According to an implementation, the alternative network location may be utilized as a backup or secondary location for use when a client is unable to access a first network location. This can occur, for instance, where a client is unable to access a first location as a result of a network brownout and is redirected to the alternative network location. This can occur, for instance, by a program instruction instructing the client to communicate with the alternative IP address subsequent to failure to communicate with the first host IP address.

According to an implementation, the anomaly detection algorithm process 400 begins with the determination of the number of alternative DNS requests received from each Autonomous System Number (ASN) in 'X' minute intervals (405). According to an implementation, raw IP addresses from clients may be mapped into ASNs using a border gateway protocol (BGP) table, such that the number of alternative requests for each ASN may be retrieved. As referenced herein, alternative DNS requests are requests for a network location. According to an implementation, alternative DNS requests are requests for a network location, which may represent the alternative location, which may indicate that a network brownout has occurred. The anomaly detection algorithm identifies the number of DNS requests (i.e., keeps a numerical count of DNS requests) for the 'X' minute time period (or interval), for example, in 2 minute intervals. This number is compared by the anomaly detection algorithm to one or more thresholds to identify whether a network brownout has occurred or is suspected of occurring.

The process 400 includes the calculation of a moving average, e.g., an Exponentially-Weighted Moving Average (EWMA), of the number of 'alternative' DNS requests (410). According to an implementation, the EWMA is a mean value, calculated in 'X' minute intervals (or in a different interval that differs from the count of DNS requests in block 405) on a continuous basis. According to another implementation, the mean for each 'X' minute interval used to calculate the EWMA is may be modified by a smoothing factor.

According to an implementation, the anomaly detection module 135 can determine the number of requests for an alternative DNS from each ASN. Alternative DNS requests may be requests for an alternative network location generated after the failure of one or more previous requests to reach a first location. The process 400 also includes the calculation (or determination) of a standard deviation based on the number of alternative DNS requests received from each ASN (415). The standard deviation (STD DEV) is based on the number of alternative requests over a long period of time, such as 1 day, 30 days, 1 year, or the like.

According to another implementation, at least one threshold value can be based on the calculated EWMA. The threshold value can also be based on the standard deviation. This permits the anomaly detection algorithm to identify, for instance, a sudden increase (or 'spike') in the number of alternative DNS requests received from each ASN for an 'X' minute interval that exceeds an EWMA and/or a standard deviation of the number of alternative DNS requests received from each ASN. This can be indicative of a network brownout where the alternative DNS requests are requests for a network location generated after the failure of one or more previous requests to reach a first location due to a network brownout.

With some implementations of the process of FIG. 4, a suspected anomaly is identified when the number of 'alternative' DNS requests exceeds a threshold, where the threshold is EWMA+2*(STD DEV) (420). An anomaly is identified is identified when the number of 'alternative' DNS requests exceeds the threshold for 'Y' minutes, for example, 30 minutes.

According to an implementation, upon the detection of an anomaly, the mean and STD DEV are not updated to prevent a skewing of the numbers based on a sudden rise due to a network brownout. According to another implementation, instead of counts of DNS requests, the square roots of such counts may be used in the above calculations.

Additionally, according to an implementation, two independent aggregators can operate in parallel, such that two anomaly detection modules also operate in parallel. Parallel alarms may also exist, albeit with cancellation of alarms for the same or duplicate DNS brownout events.

Figure 5:
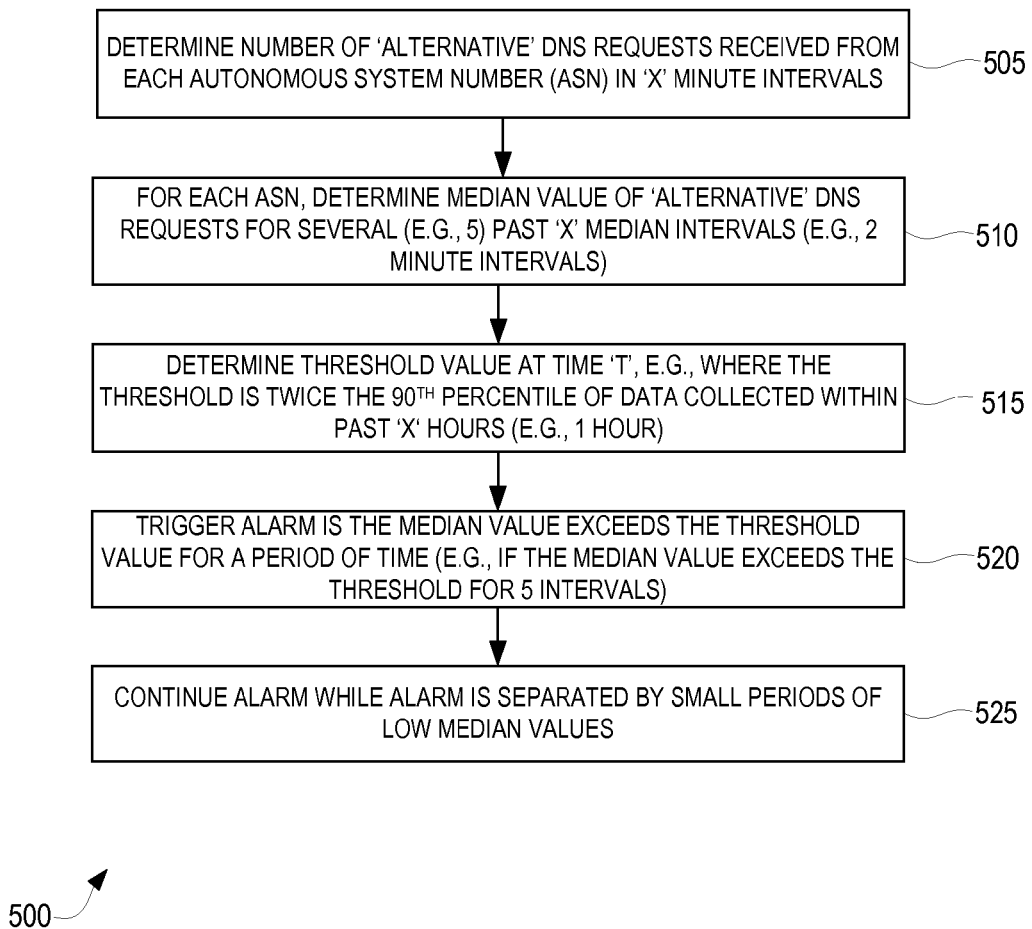
FIG. 5 is a flow chart of another example anomaly detection process.

FIG. 5 is a flow chart of another example anomaly detection process. The anomaly detection process can identify the number of alternative DNS requests received from each ASN over a past period of time (505). This total represents an ASN count. According to an implementation, the past period of time may be 2 minutes, although other periods of time (e.g., 1, 5, or 10 minutes) may be used. As described above, alternative DNS requests may be requests for an alternative network location generated after the failure of one or more previous requests to reach a first location. According to an implementation, the ASN counts over 5 past periods of time are used to generate a median value for each ASN (510). For instance, if the ASN counts over the past five periods of time (e.g., where each period of time for each ASN count is 2 minutes) for an ASN are 19, 24, 25, 32, and 37, the median ASN count value for that ASN is 25. According to an implementation, raw IP addresses from clients may be mapped into ASNs using a border gateway protocol (BGP) table, such that the number of alternative requests for each ASN may be retrieved.

A threshold is computed based on past data. According to an implementation, a threshold at time "t" may be twice the number of ASN counts representing the $90^{th}$ percentile identified for each ASN over a long period of time, such as 1 hour (515). According to an implementation, a circular buffer can be used to store the number of ASN counts taken continuously or repeatedly over the long period of time. For instance, a circular buffer can store the previous 100 most recent ASN counts for each hour of the day.

According to an implementation, where the median ASN count value for an ASN exceeds the threshold for an initial period of time, an alarm may be triggered to indicate that an anomaly is detected (520). According to an implementation, the threshold must be exceeded by a specified magnitude or value for the set period of time before the alarm is triggered. For instance, the alarm may be triggered only when the median value exceeds the threshold for 5 counts. According to another implementation, the specified magnitude may be the median ASN count minus the threshold value, divided by the threshold value.

According some implementations, alarms may be continuous although separated by short periods of low ASN counts so that alarms do not terminate while brownouts continue to occur (525). For instance, an alarm may continue until the anomaly is undetected for a period of time longer than the duration of the alarm.

According to another implementation, network brownouts can be detected for more than one ASN simultaneously. As a result, thresholds for triggering an alarm may be based on the number of requests for an alternative locations simultaneously received from multiple ASNs. For example, if a brownout for more than one ASN at the same time is detected, an alert may be triggered. The alert can be fired earlier, for instance, than the detection of an anomaly for a single ASN, based on a correlated alarm threshold. For example, three consecutive ASN count values for each ASN within a particular geographic area may trigger an alarm, which may not trigger based on the measurement of ASN count values for a single ASN (e.g., which may require 5 consecutive counts exceeding a threshold). Other values for correlating alarm thresholds may be implemented.

According to some implementations, the triggering of an alarm may be based on the number of queries per second (QPS) from users for a particular ASN where the QPS from that ASN drops while a brownout is detected. In still other implementations, a drop in QPS from an ASN may result in an earlier alarm than, e.g., the identification of the number of requests for an alternative network location. According to some implementations, when an alarm is triggered, the network can be probed to detect a location of the network brownout. For instance, a packet may be sent to a destination from which an alternative network location is requested in an attempt to trace the route of the alternative network request.

According to some implementations, the triggering of an alarm may cause an instruction to be transmitted to the user to re-attempt to reach the previous network location. The triggering of an alarm can also cause the system to transmit an instruction to one or more administrators to identify that a brownout is occurring such that action can be taken. The instruction can include details about the brownout, including, for instance, the network location that is inaccessible by users, the length of the inaccessibility, the number of users that have been redirected to the alternative site, and the like.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

That which is claimed:

1. A computer-implemented method comprising:
determining a number of queries that a Domain Name System (DNS) server has received during a particular period of time for resolving a name associated with an alternate web server that has been designated as an alternate to a primary web server, into a network address associated with the alternate web server;
determining that the number of queries that the DNS server has received during the particular period of time for resolving the name associated with the alternate web server that has been designated as an alternate to the primary web server, into the network address associated with the alternate web server, satisfies a threshold; and
determining, based at least on determining that the number of queries that the DNS server has received during the particular period of time for resolving the name associated with the alternate web server that has been designated as an alternate to the primary web server, into the network address associated with the alternate web server, satisfies the threshold, that
  (i) one or more of user devices has likely failed to open a socket connection to the primary web server,
  (ii) an established socket connection between one or more of the user devices and the primary web server has likely failed;
  (iii) one or more of the user devices likely failed to create an Hypertext Transfer Protocol (HTTP) connection with primary web server; or
  (iv) an established HTTP connection between one or more of the user devices and the primary web server has likely failed.

2. The method of claim 1, comprising determining the threshold value based at least in part on a square root of a number of queries received over a different period of time.

3. The method of claim 1, wherein determining that an established socket connection between one or more of the clients and the primary web server has failed comprises:
determining that an attempt to open a file transfer protocol (FTP) session, or a Gopher session between one or more of the clients and the primary web server has failed.

4. The method of claim 1, wherein the queries are received from one or more Autonomous System Number (ASN) computers.

5. A non-transitory computer-readable medium storing software comprising instructions executable by one or more computers which, upon such execution, cause the one or more computers to perform operations comprising:
determining a number of queries that a Domain Name System (DNS) server has received during a particular period of time for resolving a name associated with an alternate web server that has been designated as an alternate to a primary web server, into a network address associated with the alternate web server;
determining that the number of queries that the DNS server has received during the particular period of time for resolving the name associated with the alternate web server that has been designated as an alternate to the primary web server, into the network address associated with the alternate web server, satisfies a threshold; and
determining, based at least on determining that the number of queries that the DNS server has received during the particular period of time for resolving the name associated with the alternate web server that has been designated as an alternate to the primary web server, into the network address associated with the alternate web server, satisfies the threshold, that
  (i) one or more of user devices has likely failed to open a socket connection to the primary web server,
  (ii) an established socket connection between one or more of the user devices and the primary web server has likely failed;
  (iii) one or more of the user devices likely failed to create an Hypertext Transfer Protocol (HTTP) connection with primary web server; or
  (iv) an established HTTP connection between one or more of the user devices and the primary web server has likely failed.

6. The medium of claim 5, wherein determining that the one or more clients are likely unable to establish a connection with the primary web server comprises determining that a network brownout may have occurred which affects a portion of a network in which the primary web server is connected.

7. The medium of claim 5, wherein the operations comprise determining the threshold value based at least in part on a square root of a number of queries received over a different period of time.

8. The medium of claim 5, wherein determining that an established socket connection between one or more of the clients and the primary web server has failed comprises:

determining that an attempt to open a file transfer protocol (FTP) session, or a Gopher session between one or more of the clients and the primary web server has failed.

9. The medium of claim 5, wherein the queries are received from one or more Autonomous System Number (ASN) computers.

10. A system comprising:
one or more computers and one or more storage devices storing instructions that are operable, when executed by the one or more computers, to cause the one or more computers to perform operations comprising:
determining a number of queries that a Domain Name System (DNS) server has received during a particular period of time for resolving a name associated with an alternate web server that has been designated as an alternate to a primary web server, into a network address associated with the alternate web server;
determining that the number of queries that the DNS server has received during the particular period of time for resolving the name associated with the alternate web server that has been designated as an alternate to the primary web server, into the network address associated with the alternate web server, satisfies a threshold; and
determining, based at least on determining that the number of queries that the DNS server has received during the particular period of time for resolving the name associated with the alternate web server that has been designated as an alternate to the primary web server, into the network address associated with the alternate web server, satisfies the threshold, that
(i) one or more of user devices has likely failed to open a socket connection to the primary web server,
(ii) an established socket connection between one or more of the user devices and the primary web server has likely failed;
(iii) one or more of the user devices likely failed to create an Hypertext Transfer Protocol (HTTP) connection with primary web server; or
(iv) an established HTTP connection between one or more of the user devices and the primary web server has likely failed.

11. The system of claim 10, wherein the operations comprise determining the threshold value based at least in part on a square root of a number of queries received over a different period of time.

12. The system of claim 10, wherein determining that an established socket connection between one or more of the clients and the primary web server has failed comprises:
determining that an attempt to open a file transfer protocol (FTP) session, or a Gopher session between one or more of the clients and the primary web server has failed.

13. The system of claim 10, wherein the queries are received from one or more Autonomous System Number (ASN) computers.

* * * * *